No. 834,586. PATENTED OCT. 30, 1906.
J. C. MEYER.
SASH LOCK.
APPLICATION FILED MAY 15, 1906.
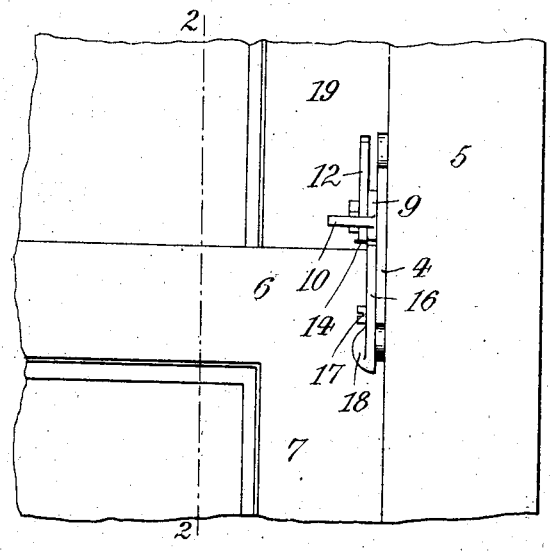
Fig. 1.
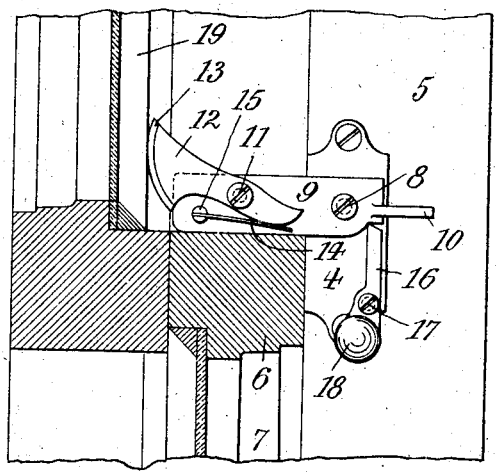
Fig. 2.
Fig. 3.
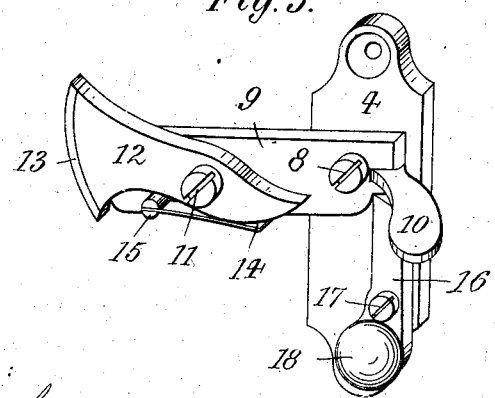
Witnesses:
Arthur Gumpe.
William Schulz.
Inventor:
Julius C. Meyer
by Frank V. Briesen Att'y.

UNITED STATES PATENT OFFICE.

JULIUS C. MEYER, OF NEW YORK, N. Y.

SASH-LOCK.

No. 834,586.

Specification of Letters Patent.

Patented Oct. 30, 1906.

Application filed May 15, 1906. Serial No. 316,937.

*To all whom it may concern:*

Be it known that I, JULIUS C. MEYER, a citizen of the United States, residing at New York city, Manhattan, county and State of New York, have invented new and useful Improvements in Sash-Locks, of which the following is a specification.

This invention relates to a sash-lock which so engages the upper sash that the latter can not be lowered or opened, but that it may be raised more or less for ventilating purposes.

The sash-lock also prevents the lower sash from being opened.

In the accompanying drawings, Figure 1 is a front view of my improved sash-lock, showing it applied to a window-frame. Fig. 2 is a section on line 2 2, Fig. 1; and Fig. 3, a perspective view of the sash-lock.

A base-plate 4 is adapted to be attached to a window-frame 5 so as to project above the top rail 6 of the lower sash 7 when the latter is lowered. To plate 4 is pivoted at 8 a two-arm lever 9, the rear arm of which has a handle 10. To the front arm of the lever is pivoted at 11 a dog 12, the eccentrically-curved working edge of which is cushioned, as at 13. A spring 14, attached by stud 15 to lever 9 and engaging the tail of dog 12, tends to swing the latter downward. The rear arm of lever 9 is adapted to be engaged by a catch 16, pivoted to plate 4 at 17 and weighted, as at 18.

In use lever 9 is swung horizontally across top rail 6 of lower sash 7, and then the catch 16 is swung upward to engage said lever, and thereby lock it in position, Fig. 2. The parts are so proportioned and assembled that the dog 12 will now engage with its working edge 13 the inner side of upper sash 19, the dog being tilted slightly upward while the spring 14 is compressed. It will be seen that the dog will be so jammed against upper sash 19 that the latter cannot be lowered, but that it can be freely raised. At the same time the lower sash 7 is by lever 9 locked against any movement.

If it is desired to release the sashes, the catch 16 is thrown out of engagement with lever 9, and the latter is swung upward by handle 10, carrying dog 12 with it.

What I claim is—

A sash-lock provided with a base-plate, a two-arm lever pivoted thereto, a spring-influenced eccentric dog pivoted to the front lever-arm, and a catch pivoted to the plate and adapted to engage the rear lever-arm, substantially as specified.

Signed by me at New York city, Manhattan, New York, this 14th day of May, 1906.

JULIUS C. MEYER.

Witnesses:
 WILLIAM SCHULZ,
 FRANK V. BRIESEN.